(12) United States Patent
Gosling (10) Patent No.: US 7,415,021 B1
(45) Date of Patent: Aug. 19, 2008

(54) METHOD AND APPARATUS FOR PRESERVING NULL SEMANTICS DURING USE OF A FORWARDING METHOD

(75) Inventor: James A. Gosling, Redwood City, CA (US)

(73) Assignee: Sun Microsystems, Inc., Santa Clara, CA (US)

(*) Notice: Subject to any disclaimer, the term of this patent is extended or adjusted under 35 U.S.C. 154(b) by 692 days.

(21) Appl. No.: 11/010,697

(22) Filed: Dec. 9, 2004

Related U.S. Application Data (60) Provisional application No. 60/612,595, filed on Sep. 22, 2004.

(51) Int. Cl.
H04L 12/56 (2006.01)

(52) U.S. Cl. .................. 370/392; 717/151

(58) Field of Classification Search .......... 370/352, 370/389; 707/1, 101, 103; 719/315; 717/124, 717/137, 131, 166
See application file for complete search history.

(56) References Cited

U.S. PATENT DOCUMENTS

| | | | |
|---|---|---|---|
| 5,481,712 A * | 1/1996 | Silver et al. .................. 717/109 |
| 5,560,009 A * | 9/1996 | Lenkov et al. .............. 717/124 |
| 5,812,850 A * | 9/1998 | Wimble ....................... 717/131 |
| 5,815,415 A * | 9/1998 | Bentley et al. ................. 703/4 |
| 6,347,342 B1 * | 2/2002 | Marcos et al. .............. 719/315 |
| 6,591,272 B1 * | 7/2003 | Williams ..................... 707/102 |
| 6,880,126 B1 * | 4/2005 | Bahrs et al. ................. 715/526 |
| 6,975,628 B2 * | 12/2005 | Johnson et al. ............. 370/389 |
| 7,058,935 B2 * | 6/2006 | Kawahito et al. ........... 717/151 |
| 7,080,366 B2 * | 7/2006 | Kramskoy et al. .......... 717/148 |
| 7,093,242 B2 * | 8/2006 | Bernadat et al. ............ 717/166 |
| 7,113,939 B2 * | 9/2006 | Chou et al. ..................... 707/3 |
| 7,139,766 B2 * | 11/2006 | Thomson et al. ............ 707/101 |
| 7,194,543 B2 * | 3/2007 | Robertson et al. ........... 709/226 |
| 7,275,079 B2 * | 9/2007 | Brodsky et al. ............. 709/203 |
| 7,280,558 B1 * | 10/2007 | Grunkemeyer et al. ...... 370/466 |
| 7,346,897 B2 * | 3/2008 | Vargas ........................ 717/137 |
| 2003/0091028 A1 * | 5/2003 | Chang et al. ................. 370/352 |
| 2005/0256834 A1 * | 11/2005 | Millington et al. ............. 707/1 |
| 2006/0039371 A1 * | 2/2006 | Castro et al. ................ 370/389 |

* cited by examiner

*Primary Examiner*—Thong H Vu
(74) *Attorney, Agent, or Firm*—Park, Vaughan & Fleming LLP (57) ABSTRACT

One embodiment of the present invention provides a system that facilitates moving an original method from a source class to a destination class and for constructing a corresponding forwarding method in the source class that preserves null semantics. During operation, the system translates the original method from the source class into a corresponding moved method, and then incorporates the moved method into the destination class. The system also constructs a forwarding method that invokes the moved method in the destination class. The system then replaces the original method in the source class with the forwarding method. In this way, invoking the forwarding method in the source class causes the moved method to be invoked in the destination class. While constructing the forwarding method, the system generates code that checks whether a "source parameter" of the original method whose class matches the destination class is null. If so, the generated code executes the body of the original method. Otherwise, the generated code invokes the moved method in the destination class. The system also optimizes the generated code to produce optimized code for the forwarding method, whereby portions of the original method can possibly be optimized away.

20 Claims, 4 Drawing Sheets

METHOD AND APPARATUS FOR PRESERVING NULL SEMANTICS DURING USE OF A FORWARDING METHOD

RELATED APPLICATION

This application hereby claims priority under 35 U.S.C. §119 to U.S. Provisional Patent Application No. 60/612,595 filed on 22 Sep. 2004, entitled "Method and Apparatus for Preserving NULL Semantics During Use of a Forwarding Method," by inventor James A. Gosling.

BACKGROUND

The present invention relates to tools for automating the development of applications for computer systems.

During application development, it is quite common for a programmer to move a method from one class to another class. This is typically accomplished by manually moving the method from the source class to the destination class, and then fixing up references within the moved method to be compatible with the destination class. For example, the source instance (referred to as "this") for the source class can become a parameter in the moved method, and the "source parameter" whose class matches the destination class becomes the destination instance ("this") in the moved method.

When the method is moved, it is customary to replace the original method in the source class with a forwarding method, so that invoking the forwarding method in the source class causes the moved method to be invoked in the destination class. In this way, references to the original method in the source class are automatically forwarded to the moved method in the destination class.

However, using a forwarding method can be tricky because of a simple problem: the source parameter (which becomes "this" in the destination class) may be null. If the forwarder is constructed by simply converting the source parameter into the destination instance as described above, a problem may arise because the destination instance ("this") in the destination class can never be null. Hence, if the source parameter is null, and the original method in the source class performs some action based on the null value of the source parameter, the moved method in the destination class may not perform the same action.

SUMMARY

One embodiment of the present invention provides a system that facilitates moving an original method from a source class to a destination class and for constructing a corresponding forwarding method in the source class that preserves null semantics. During operation, the system translates the original method from the source class into a corresponding moved method, and then incorporates the moved method into the destination class. The system also constructs a forwarding method that invokes the moved method in the destination class. The system then replaces the original method in the source class with the forwarding method. In this way, invoking the forwarding method in the source class causes the moved method to be invoked in the destination class. While constructing the forwarding method, the system generates code that checks whether a "source parameter" of the original method whose class matches the destination class is null. If so, the generated code executes the body of the original method. Otherwise, the generated code invokes the moved method in the destination class. The system also optimizes the generated code to produce optimized code for the forwarding method, whereby portions of the original method can possibly be optimized away.

In a variation on this embodiment, translating the original method into the corresponding moved method involves replacing references through the source parameter with references through a destination instance associated with the destination class.

In a variation on this embodiment, translating the original method into the corresponding moved method involves adding a destination parameter to the moved method, wherein the destination parameter contains a backpointer to a source instance associated with the original method. It also involves replacing references through the source instance with references through the destination parameter.

In a variation on this embodiment, optimizing the generated code involves using compiler-based techniques to optimize the generated code.

In a variation on this embodiment, optimizing the generated code involves performing value propagation and exception propagation operations on the generated code. In a further variation, the system additionally performs algebraic manipulations to simplify the optimized code.

In a variation on this embodiment, optimizing the generated code can involve inserting exception-throwing code, which throws a null-pointer exception, into the forwarding method. In a further variation, the system eliminates the exception-throwing code, if possible, through algebraic simplification.

BRIEF DESCRIPTION OF THE FIGURES

Tables 1A-1F illustrate a first example of moving a method between classes in accordance with an embodiment of the present invention.

Tables 2A-2F illustrate a second example of moving a method between classes in accordance with an embodiment of the present invention.

Tables 3A-3E illustrate a second example of moving a method between classes in accordance with an embodiment of the present invention.

Tables 4A-4E illustrate a second example of moving a method between classes in accordance with an embodiment of the present invention.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. This includes, but is not limited to, magnetic and optical storage devices, such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as a LAN, a WAN or the Internet.

Moving a Method

Figure 1A:
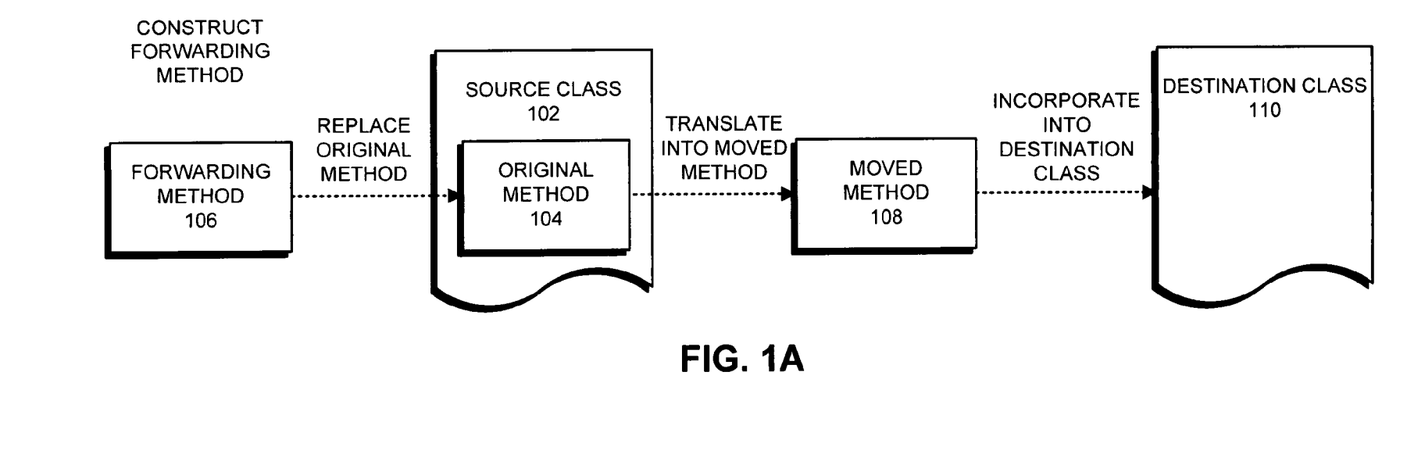
FIG. 1A illustrates the process of moving a method from a source class to a destination class in accordance with an embodiment of the present invention.

FIG. 1A illustrates the process of moving a method from a source class 102 to a destination class 110 in accordance with an embodiment of the present invention. The process starts with an original method 104 located within a source class 102. As is illustrated in FIG. 1, original method 104 is translated into moved method 108. This translation process involves fixing up references within moved method 108 so that the references are compatible with the destination class. (This translation process is described in more detail below with reference to FIGS. 2-6.) Moved method 108 is then incorporated into the destination class 110.

The process of moving the method also involves constructing a forwarding method 106, wherein invoking forwarding method 106 in source class 102 causes moved method 108 to be invoked in destination class 110. Note forwarding method 106 is constructed in a way that preserves null semantics (This is described in more detail below with reference to FIGS. 5-6).

The system then replaces original method 104 in source class 102 with forwarding method 106, so that invocations to original method 104 are now directed to forwarding method 106, and wherein forwarding method 106 causes moved method 108 in destination class 110 to be invoked.

Figure 1B:
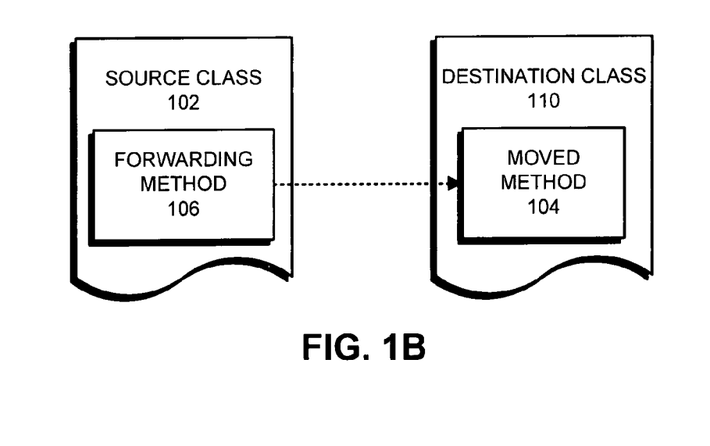
FIG. 1B illustrates the result of moving a method from a source class to a destination class in accordance with an embodiment of the present invention.

Referring to FIG. 1B, after original method 104 is moved, source class 102 contains forwarding method 106 instead of original method 104, and forwarding method 106 invokes moved method 108 in destination class 110.

Note that the above-described process for moving a method can be performed by a software development tool that automatically performs most if not all of the manipulations required to move the method, fix up the references, and generate a forwarding method.

How References are Modified

Figure 2:
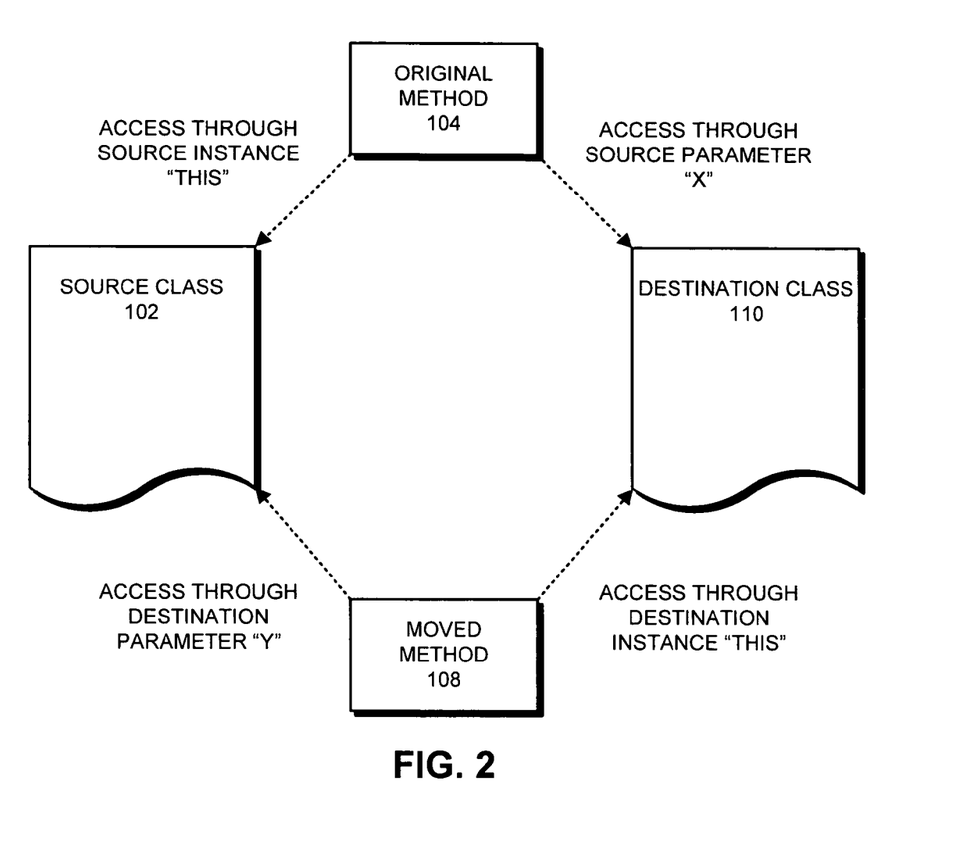
FIG. 2 illustrates how references are modified during the process of converting the original method into the moved method in accordance with an embodiment of the present invention.

FIG. 2 illustrates how references are modified during the process of translating original method 104 into the moved method 108 in accordance with an embodiment of the present invention. As illustrated in FIG. 2, original method 104, which is located in source class 102, references various program elements associated with source class 102 through a source instance ("this" in the source class). During this translation process, references through the source instance are converted into references through a destination parameter "y." This can be accomplished by first adding the destination parameter y to the moved method 108, wherein the destination parameter y contains a backpointer to the source instance, and then replacing references through the source instance with references through the destination parameter y.

Original method 104 may also contain references through a source parameter "x" to program elements associated with destination class 110. During the above-described translation process, these references are translated into corresponding references through a destination instance associated with the destination class ("this" in the destination class).

Process of Moving a Method

Figure 3:
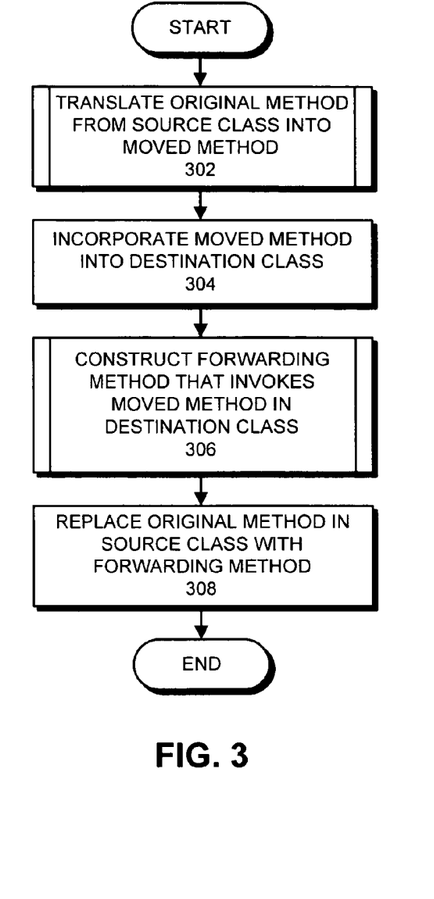
FIG. 3 presents a flow chart illustrating how a method is moved from a source class to a destination class in accordance with an embodiment of the present invention.

FIG. 3 presents a flow chart illustrating how original method 104 is moved from source class 102 to a destination class 110 in accordance with an embodiment of the present invention. The system first translates original method 104 into moved method 108 (step 302). Next, the system incorporates moved method 108 into the destination class 110 (step 304). The system additionally constructs forwarding method 106 (step 306), and replaces original method 104 with forwarding method 106 in source class 102 (step 308).

Translating the Original Method into the Moved Method

Figure 4:
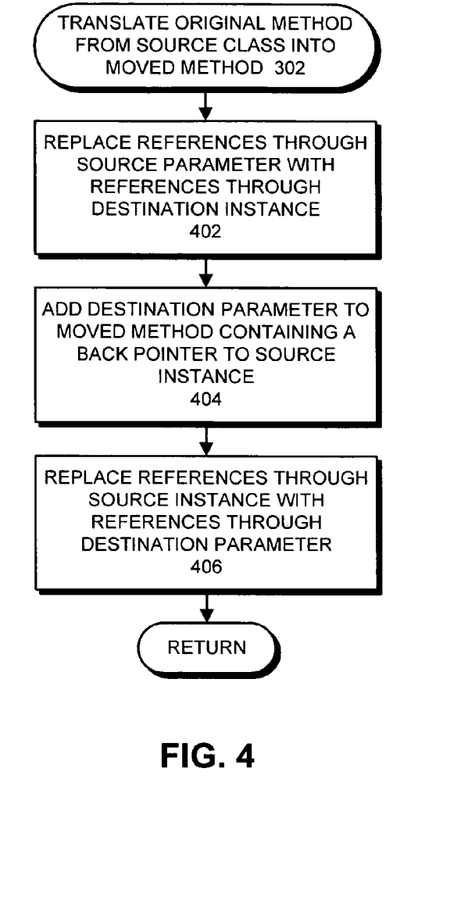
FIG. 4 presents a flow chart illustrating how an original method is translated into a moved method in accordance with an embodiment of the present invention.

FIG. 4 presents a flow chart illustrating how original method 104 is translated into moved method 108 in accordance with an embodiment of the present invention. (Note that FIG. 4 illustrates the operations involved in performing step 302 in FIG. 3 above.) As was describe above, during the translation process, the system replaces references through the source parameter with references through the destination instance (step 402). The system also adds a destination parameter "y" to moved method 108 (step 404), and replaces references through the source instance with references through the destination parameter (step 406).

Generating a Forwarding Method

Figure 5:
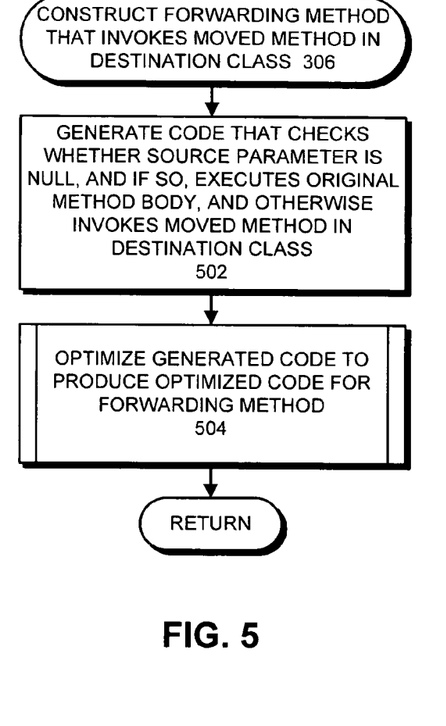
FIG. 5 presents a flow chart illustrating how a forwarding method is generated in accordance with an embodiment of the present invention.

FIG. 5 presents a flow chart illustrating how forwarding method 106 is generated in accordance with an embodiment of the present invention. (Note that FIG. 5 illustrates operations involved in performing step 306 in FIG. 3 above.) While generating forwarding method 106, the system generates code that checks whether the source parameter is null, and if so executes the body of original method 104. Otherwise, the code invokes moved method 108 in destination class 110 (step 502).

Next, the system optimizes the generated code to produce optimized code for forwarding method 106 (step 504). (Note that code within moved method 108 can also be optimized.) This optimization process hopefully eliminates some of the code from the body of original method 104.

Figure 6:
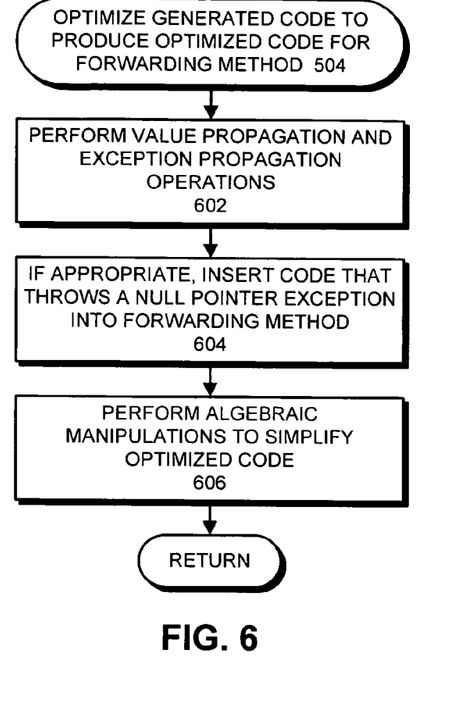
FIG. 6 presents a flow chart illustrating how the forwarding method is optimized in accordance with an embodiment of the present invention.

More specifically, referring to FIG. 6, the optimization process can involve performing value propagation and exception propagation operations (step 602). Also, if appropriate, the system can insert code that throws a null pointer exception into forwarding method 106 (step 604). Finally, the system can perform a number of algebraic manipulations to further simplify the optimized code (step 606).

In the sections that follow, we present a number of examples illustrating how methods are moved between classes.

FIRST EXAMPLE

In the first example, we move the method firstStatPos ( ) to class com.sun.tools.javac.v8.tree.Tree. The original method appears below.

TABLE 1A

```
public static int firstStatPos(Tree tree) {
    if (tree.tag == Tree.BLOCK
            && ((Block)tree).stats.nonEmpty( ))
        return ((Block)tree).stats.head.pos;
    else
        return tree.pos;
}
```

This original method is translated into the moved method that follows.

TABLE 1B

```
public int firstStatPos( ) {
    if (tag == BLOCK
        && ((Block)this).stats.nonEmpty( ))
            return ((Block)this).stats.head.pos;
    else
        return pos;
}
```

In this case, the first parameter has become "this" and there is no need for a back reference to the original object.

Next, after a cleanup operation, the moved method appears as follows.

TABLE 1C

```
public int firstStatPos( ) {
    return tag == BLOCK
            && ((Block)this).stats.nonEmpty( )
        ? ((Block)this).stats.head.pos
        : pos;
}
```

The cleanup involves collapsing the if and return statements into a single return with a conditional.

The basic strategy for constructing the forwarding method is to check for null, execute the original method body if null, and otherwise invoke the moved method. The raw forwarding method appears below.

TABLE 1D

```
public static int firstStatPos(Tree tree) {
    if (tree == null) {
        if (tree.tag == Tree.BLOCK
                && ((Block)tree).stats.nonEmpty( ))
            return ((Block)tree).stats.head.pos;
        else
            return tree.pos;
    }
    else
        return tree.firstStatPos( );
}
```

After truth and exception propagation operations the forwarding method appears as follows.

TABLE 1E

```
public static int firstStatPos(Tree tree) {
    if (tree == null)
        throw new NullPointerException( );
    else
        return tree.firstStatPos( );
}
```

The truth propagator realizes that enclosing the "if" implies tree==null, which in turn implies that "tree.tag" must throw a NullPointerException.

Next, after a cleanup operation, the forwarding method appears as follows.

TABLE 1F

```
public static int firstStatPos(Tree tree) {
    return tree.firstStatPos( );
}
```

Note that the if and throw get eliminated through algebraic simplification because tree.firstStatPos( ) implicitly subsumes them.

SECOND EXAMPLE

In the second example, we move the method iSEmpty( ) to class com.sun.tools.javac.v8.tree.Tree. The original method appears below. This method is tricky because the original method has non-exceptional behavior in the null case.

TABLE 2A

```
public static boolean isEmpty(Tree t) {
    if (t == null) return true;
    switch (t.tag) {
    default:
        return false;
    case Tree.BLOCK:
        for (List stats=((Block)t).stats;
                    stats.nonEmpty( );
                    stats=stats.tail)
            if(!isEmpty(stats.head)) return false;
    case Tree.SKIP:
        return true;
    }
}
```

The original method is translated into the moved method that follows.

TABLE 2B

```
public static boolean isEmpty( ) {
    if (this == null) return true;
    switch (tag) {
    default:
        return false;
    case BLOCK:
        for (List stats=((Block)this).stats;
                    stats.nonEmpty( );
                    stats=stats.tail)
            if(!Operator.isEmpty(stats.head))
                return false;
    case SKIP:
        return true;
    }
}
```

Note that "this" in the moved method is never null, so the initial if statement can be eliminated.

Next, after a cleanup operation, the moved method appears as follows.

TABLE 2C

```
public boolean isEmpty( ) {
    switch (t.tag) {
    default:
        return false;
    case BLOCK:
        for (List stats=((Block)this).stats;
                stats.nonEmpty( );
                stats=stats.tail)
            if(!Operator.isEmpty(stats.head))
                return false;
    case SKIP:
        return true;
    }
}
```

The raw forwarding method appears below.

TABLE 2D

```
public static boolean isEmpty(Tree t) {
    if (t == null) {
        if (t == null) return true;
        switch (t.tag) {
        default:
            return false;
        case Tree.BLOCK:
            for (List stats=((Block)t).stats;
                    stats.nonEmpty( );
                    stats=stats.tail)
                if(!isEmpty(stats.head))
                    return false;
        case Tree.SKIP:
            return true;
        }
    } else return t.isEmpty( );
}
```

After truth and exception propagation operations the forwarding method appears as follows.

TABLE 2E

```
public static boolean isEmpty(Tree t) {
    if (t == null) {
        if (t == null)
            return true;
        throw new NullPointerException( );
    } else return t.isEmpty( );
}
```

Note that the second null check is clearly implied to be true, and t.tag clearly throws a NullPointerException, but this throw will be eliminated since the preceding return is always taken.

Next, after a cleanup operation, the forwarding method appears as follows.

TABLE 2F

```
public static boolean isEmpty(Tree t) }
    return t == null || t.isEmpty( ) ;
}
```

This cleanup operation may not be obvious. The if(t==null) return tree; else return . . .

becomes return t==null?true: . . . , which in turn becomes t==null|| . . . .

THIRD EXAMPLE

In the third example, we move the method deblock( ) to class com.sun.tools.javac.v8.tree.Tree. Themajorcomplexityhereis that the parameter that will be mapped to "this" is assigned to. This can be handled straightforwardly by declaring a local variable that starts out shadowing "this." The original method appears below.

TABLE 3A

```
public static Tree deblock(Tree t) {
    while (t != null)
        switch (t.tag) {
        case Tree.BLOCK: {
            List stats = ((Block)t).stats;
            if (!stats.isEmpty( ) &&
                    stats.tail.isEmpty( ))
                t = stats.head;
            else
                return t;
            break;
        }
        case Tree.PARENS:
            t = ((Parens)t).expr;
            break;
        case Tree.EXEC:
            t = ((Exec)t).expr;
            break;
        default:
            return t;
        }
    return null;
}
```

The original method is translated into the following moved method.

TABLE 3B

```
public static Tree deblock( ) {
    Tree t = this;
    while (t != null)
        switch (t.tag) {
        case Tree.BLOCK: {
            List stats = ((Block)t).stats;
            if (!stats.isEmpty( ) &&
                    stats.tail.isEmpty( ))
                t = stats.head;
            else
                return t;
            break;
        }
        case PARENS:
            t = ((Parens)t).expr;
            break;
        case EXEC:
            t = ((Exec)t).expr;
            break;
        default:
            return t;
        }
    return null;
}
```

The raw forwarding method appears below.

TABLE 3C

```
public static Tree deblock(Tree t) {
    if (t == null) {
        while (t != null) {
            switch (t.tag) {
            case Tree.BLOCK: {
                List stats = ((Block)t).stats;
```

TABLE 3C-continued

```
            if (!stats.isEmpty( ) &&
                    stats.tail.isEmpty( ))
                t = stats.head;
            else
                return t;
            break;
        }
        case Tree.PARENS:
            t = ((Parens)t).expr;
            break;
        case Tree.EXEC:
            t = ((Exec)t).expr;
            break;
        default:
            return t;
        }
        return null;
    }
    else return t.deblock( );
}
```

After truth and exception propagation operations the forwarding method appears as follows.

TABLE 3D

```
public static Tree deblock(Tree t) {
    if (t == null) {
        while (t != null) {
            ...
            return null;
        }
    }
    else return t.deblock( );
}
```

Next, after a cleanup operation, the forwarding method appears as follows.

TABLE 3E

```
public static Tree deblock(Tree t) {
    return t == null ? null : t.deblock( );
}
```

This simplifies nicely: "while (t!=null)" drops out because t is known to be null on first entry to the loop.

FOURTH EXAMPLE

In the fourth example, we move the method statement( ) to class com.sun.tools.javac.v8.tree.Tree. The major complexity here is that the original method references methods in the containing class. To deal with this problem, a synthetic parameter "theOperator" is added, which provides a backpointer to the original object. All references that had been to "this" are now replaced with the new parameter. The original method appears below.

TABLE 4A

```
public Tree statement (Tree t)       {
    if (t == null) return t;
    if (t.tag == Tree.CONDEXPR) {
        Conditional ce = (Conditional)t;
        t = If(ce.cond,    ce.truepart,
                           ce. falsepart)
    }
```

TABLE 4A-continued

```
    else if (t.tag >= Tree.APPLY)
        t = make.Exec(t);
    return t;
}
```

The original method is translated into the following moved method.

TABLE 4B

```
public Tree statement (Operator theOperator) {
    Tree t = this;
    if (t == null) return t;
    if (tag == CONDEXPR) {
        Conditional ce = (Conditional)t;
        t = theOperator.If(ce.cond,
                           ce.truepart,
                           ce.falsepart)   ;
    }
    else if (tag >= APPLY)
        t = theOperator.make.Exec(t);
    return t;
}
```

The raw forwarding method appears below. Note that the forwarding method now passes the backpointer as an extra argument.

TABLE 4C

```
public Tree statement (Tree t) {
    if (t == null) {
        if (t == null) return t;
        if (t.tag == Tree.CONDEXPR) {
            Conditional ce = (Conditional)t;
            t = If(ce.cond,    ce.truepart,
                               ce.falsepart)
        }
        else if (t.tag >= Tree.APPLY)
            t = make.Exec(t);
        return t;
    }
    else
        return t.statement(this);
}
```

After truth and exception propagation operations the forwarding method appears as follows.

TABLE 4D

```
public Tree statement (Tree t) {
    if (t == null) {
        if (t == null) return t;
        throw new NullPointerException( );
    }
    else return t.statement(this);
}
```

Next, after a cleanup operation, the forwarding method appears as follows.

TABLE 4E

```
public Tree statement (Tree t) {
    return t == null ? t : t.statement(this);
}
```

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for moving an original programmatic-method from a source class to a destination class and for constructing a corresponding forwarding programmatic-method in the source class that preserves null semantics, the method comprising:

translating the original programmatic-method from the source class into a corresponding moved programmatic-method;

incorporating the moved programmatic-method into the destination class;

constructing a forwarding programmatic-method that invokes the moved programmatic-method in the destination class; and replacing the original programmatic-method in the source class with the forwarding programmatic-method, whereby invoking the forwarding programmatic-method in the source class causes the moved programmatic-method to be invoked in the destination class;

wherein constructing the forwarding programmatic-method involves, generating code that checks whether a "source parameter" of the original programmatic-method whose class matches the destination class is null, and if so, executes the body of the original programmatic-method, and otherwise invokes the moved programmatic-method in the destination class, and optimizing the generated code to produce optimized code for the forwarding programmatic-method, whereby portions of the original programmatic-method can possibly be optimized away.

2. The method of claim 1, wherein translating the original programmatic-method into the corresponding moved programmatic-method involves replacing references through the source parameter with references through a destination instance associated with the destination class.

3. The method of claim 1, wherein translating the original programmatic-method into the corresponding moved programmatic-method involves:

adding a destination parameter to the moved programmatic-method, wherein the destination parameter contains a backpointer to a source instance associated with the original programmatic-method; and replacing references through the source instance with references through the destination parameter.

4. The method of claim 1, wherein optimizing the generated code involves using compiler-based techniques to optimize the generated code.

5. The method of claim 1, wherein optimizing the generated code involves performing value propagation and exception propagation operations on the generated code.

6. The method of claim 5, wherein optimizing the generated code additionally involves performing algebraic manipulations to simplify the optimized code.

7. The method of claim 1, wherein optimizing the generated code can involve inserting exception-throwing code, which throws a null-pointer exception, into the forwarding programmatic-method.

8. The method of claim 7, wherein optimizing the generated code involves eliminating the exception-throwing code, if possible, through algebraic simplification.

9. A computer-readable storage medium storing instructions that when executed by a computer cause the computer to perform a method for moving an original programmatic-method from a source class to a destination class and for constructing a corresponding forwarding programmatic-method in the source class that preserves null semantics, the method comprising:

translating the original programmatic-method from the source class into a corresponding moved programmatic-method;

incorporating the moved programmatic-method into the destination class;

constructing a forwarding programmatic-method that invokes the moved programmatic-method in the destination class; and replacing the original programmatic-method in the source class with the forwarding programmatic-method, whereby invoking the forwarding programmatic-method in the source class causes the moved programmatic-method to be invoked in the destination class;

wherein constructing the forwarding programmatic-method involves, generating code that checks whether a "source parameter" of the original programmatic-method whose class matches the destination class is null, and if so, executes the body of the original programmatic-method, and otherwise invokes the moved programmatic-method in the destination class, and optimizing the generated code to produce optimized code for the forwarding programmatic-method, whereby portions of the original programmatic-method can possibly be optimized away.

10. The computer-readable storage medium of claim 9, wherein translating the original programmatic-method into the corresponding moved programmatic-method involves replacing references through the source parameter with references through a destination instance associated with the destination class.

11. The computer-readable storage medium of claim 9, wherein translating the original programmatic-method into the corresponding moved programmatic-method involves:

adding a destination parameter to the moved programmatic-method, wherein the destination parameter contains a backpointer to a source instance associated with the original programmatic-method; and replacing references through the source instance with references through the destination parameter.

12. The computer-readable storage medium of claim 9, wherein optimizing the generated code involves using compiler-based techniques to optimize the generated code.

13. The computer-readable storage medium of claim 9, wherein optimizing the generated code involves performing value propagation and exception propagation operations on the generated code.

14. The computer-readable storage medium of claim 13, wherein optimizing the generated code additionally involves performing algebraic manipulations to simplify the optimized code.

15. The computer-readable storage medium of claim 9, wherein optimizing the generated code can involve inserting exception-throwing code, which throws a null-pointer exception, into the forwarding programmatic-method.

16. The computer-readable storage medium of claim 15, wherein optimizing the generated code involves eliminating the exception-throwing code, if possible, through algebraic simplification.

17. An apparatus that moves an original programmatic-method from a source class to a destination class and that generates a corresponding forwarding programmatic-method in the source class that preserves null semantics, the apparatus comprising:

a translation mechanism configured to translate the original programmatic-method from the source class into a corresponding moved programmatic-method in the destination class;

a construction mechanism configured to construct a forwarding programmatic-method that invokes the moved programmatic-method in the destination class; and a replacement mechanism configured to replace the original programmatic-method in the source class with the forwarding programmatic-method, whereby invoking the forwarding programmatic-method in the source class causes the moved programmatic-method to be invoked in the destination class;

wherein while constructing the forwarding programmatic-method, the construction mechanism is configured to, generate code that checks whether a "source parameter" of the original programmatic-method whose class matches the destination class is null, and if so, executes the body of the original programmatic-method, and otherwise invokes the moved programmatic-method in the destination class, and to optimize the generated code to produce optimized code for the forwarding programmatic-method, whereby portions of the original programmatic-method can possibly be optimized away.

18. The apparatus of claim 17, wherein while translating the original programmatic-method into the corresponding moved programmatic-method, the translation mechanism is configured to replace references through the source parameter with references through a destination instance associated with the destination class.

19. The apparatus of claim 17, wherein while translating the original programmatic-method into the corresponding moved programmatic-method, the translation mechanism is configured to:

add a destination parameter to the moved programmatic-method, wherein the destination parameter contains a backpointer to a source instance associated with the original programmatic-method; and to replace references through the source instance with references through the destination parameter.

20. The apparatus of claim 17, wherein the construction mechanism is configured to use compiler-based techniques to optimize the generated code.

* * * * *